United States Patent
Lindfors

(10) Patent No.: US 9,682,893 B2
(45) Date of Patent: Jun. 20, 2017

(54) WONDERJUICE—PLANT GROWTH STIMULATOR

(71) Applicant: Kenneth Lindfors, Ault, CO (US)

(72) Inventor: Kenneth Lindfors, Ault, CO (US)

( * ) Notice: Subject to any disclaimer, the term of this patent is extended or adjusted under 35 U.S.C. 154(b) by 0 days.

(21) Appl. No.: 14/599,497

(22) Filed: Jan. 17, 2015

(65) Prior Publication Data

US 2016/0207842 A1    Jul. 21, 2016

(51) Int. Cl.
  *C05B 17/00*    (2006.01)
  *C05B 7/00*    (2006.01)

(52) U.S. Cl.
  CPC ............... *C05B 17/00* (2013.01); *C05B 7/00* (2013.01)

(58) Field of Classification Search
  CPC .................. C05B 17/00; C05B 7/00
  USPC ............................................. 71/15
  See application file for complete search history.

(56) References Cited

U.S. PATENT DOCUMENTS

| 2009/0266125 | A1* | 10/2009 | Doan | .................. | C05F 17/0027 71/9 |
| 2016/0083309 | A1* | 3/2016 | Pina | ........................ | C05B 17/00 71/11 |

OTHER PUBLICATIONS

Rodel G. Maghirang. Institute of Plant BreedingCrop. Science Cluster, College of Agriculture, University of the Philippines Los Baños, College, Laguna 4031, Jul. 13, 2011.*
OrganicSources. Workshop Notes: Organic Sources of NPK and trace elements. Jul. 15, 2012.*
Magical Molasses: Part II pp. 1-6 (Sep. 16, 2013) <http://www.cannabis.info/us/abc/30005808-magical-molasses-part-ii>.*
Garlic, raw. Nutrition Facts pp. 2-3 (Sep. 14, 2014) <http://nutritiondata.self.com/facts/vegetables-and-vegetable-products/2446/2#>.*
Blackstrap Molasses MSDS Nov. 1, 2011.*
Alaska Fish Fertilizer MSDS Apr. 22, 2007.*
The Eccentric Barefoot Gardener, pp. 1-7 (Jun. 2013) <http://www.summitgardennetwork.org/wp-content/uploads/2013/06/Barefoot-Gardener.pdf.*
Helen Gazely, "Foliar Feeding—Folly or Wisdom". pp. 1-6 (Aug. 31, 2012) <https://www.growveg.com/guides/foliarfeedingfolyorwisdom/>.*

* cited by examiner

*Primary Examiner* — Jennifer A Smith
(74) *Attorney, Agent, or Firm* — Craig R. Miles; CR Miles P.C.

(57) ABSTRACT

WonderJuice is a plant growth stimulator solution. The solution stimulation enhances the ability for plant root-hair uptake systems to transmit and absorb the abundance of nutrients in the solution to be available for optimal growth and plant production.

2 Claims, No Drawings

WONDERJUICE—PLANT GROWTH STIMULATOR

RELATED APPLICATIONS

None

FEDERALLY SPONSORED RESEARCH

None

JOINT RESEARCH AGREEMENTS

None

SEQUENCE LISTING

None

BACKGROUND

I was unsatisfied with all other products I tried, so I applied my education in chemistry and biology to create a new product: WonderJuice.

BRIEF SUMMARY OF THE INVENTION

WonderJuice is a growth stimulator for plants.
a. WonderJuice provides macro nutrients to plant root systems that are then absorbed via root-hair uptake systems in plants. Macro nutrients include: calcium (Ca), Magnesium (Mg), Potassium (K), Nitrogen (N), Phosphorous (P), and Sulfur (S).
b. WonderJuice provides micro nutrients to plant root systems that are then absorbed via root-hair uptake systems in plants. Micro nutrients include: Iron (Fe), Boron (B), Copper (Cu), Zinc (Zn), Molybdenum (Mo), Chlorine (CI), Cobalt (Co), Selenium (Se), Iodine (I), and Magnesium (Mn).
c. WonderJuice provides sugars to promote high level of nutrient source for growth media (soil or hydroponic) Flora and Fauna to enhance symbiotic relationship with growth media (soil or hydroponic).
d. Higher concentrations of potassium and phosphorous have been shown to increase growth and flowering and extend growth phases.
e. WonderJuice has a ph level of 7, causing growth mediums to make the root-hair uptake environment neutral.

DRAWINGS

None

DETAILED DESCRIPTION OF THE INVENTION

Formula for WonderJuice Molasses 10 ml; Fish Fertilizer 10 ml; Potassium 0.125 g at 50% purity* (purity will cause number of grams to change in proportion to purity); phosphorous 0.15 g at 61% purity* (purity will cause number of grams to change in proportion to purity). *Potassium and Phosphorous: The concentration of initial chemical source is 50%. With each new source of the chemical, the gram amount will need to be adjusted to maintain formula uniformity.

This solution is mixed and diluted out to 1 gal usable solution. The amount used will vary according to the recipient plant size.

The invention claimed is:
1. A method of stimulating growth of a plant, comprising: obtaining a plant growth stimulator solution consisting of:
    0.26% molasses by volume;
    0.26% fish fertilizer by volume;
    0.0016% additional potassium by weight;
    0.0024% additional phosphorous by weight; and
    water diluent in sufficient amount to total 100%; and
applying said plant growth stimulator to plant root systems for absorption via root-hair uptake.
2. The method of claim 1, wherein said plant growth stimulator solution has a pH of 7.

* * * * *